April 19, 1955        W. F. MILLER        2,706,430
AUXILIARY BRIDGE FOR BIFOCAL LENSES
Filed Feb. 20, 1952
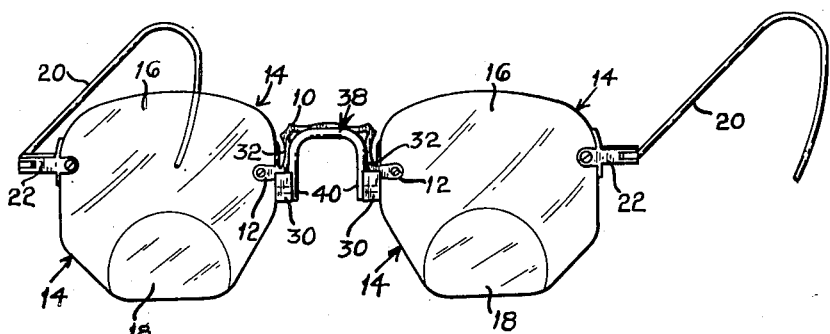
Fig. 1
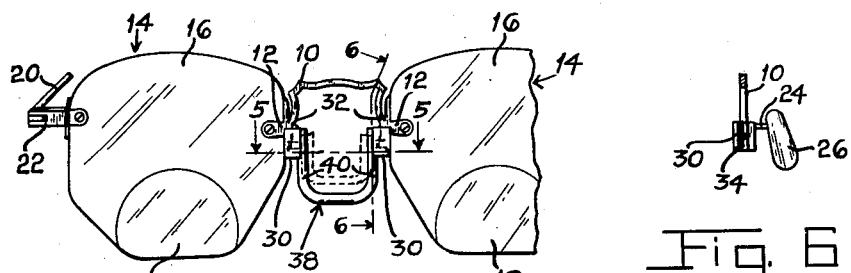
Fig. 2      Fig. 6
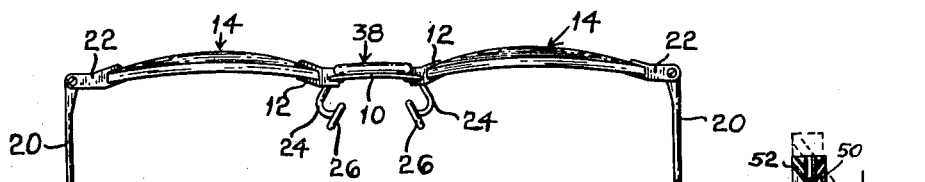
Fig. 3
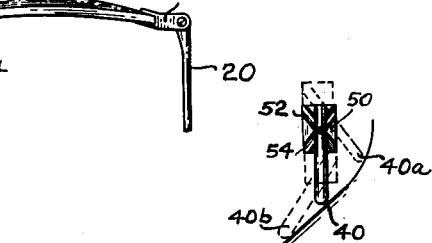
Fig. 7
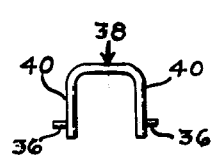    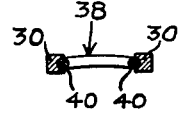
Fig. 4      Fig. 5
INVENTOR.
Walter F. Miller
BY Henry G. Dybvig
His Attorney United States Patent Office 2,706,430
Patented Apr. 19, 1955

2,706,430

AUXILIARY BRIDGE FOR BIFOCAL LENSES

Walter F. Miller, Dayton, Ohio

Application February 20, 1952, Serial No. 272,634

2 Claims. (Cl. 88—49)

This invention relates to spectacles that are adjustable vertically, so as to shift the relative position of various focal areas of the glasses or lenses with respect to the pupils of the eyes.

As is well known, bifocal or multi-focal spectacles have two or more areas so ground that the focal lengths of the various areas differ from the focal lengths of the other areas. For purposes of illustration, spectacles of the bifocal type have been shown. In the conventional bifocal spectacles, there are two areas, one the greater portion of the lenses that may be referred to as the distance portion of the lenses and a reading portion having a much shorter focal length. The reading portion is usually arcuate and located slightly below the level of the pupils, so that in using the reading portion when the spectacles are in the normal position, it is necessary to have the reading material located at a level lower than the level of the pupils of the eyes. In other words, it is necessary to look downwardly in order to utilize the reading area of the lenses. For most purposes this arrangement is quite satisfactory. When it is found necessary to look straight ahead or upwardly at a nearby object, it may be desirable to use the reading area. It is then either necessary to raise the head, so as to thereby align the reading area of the lenses with the pupils of the eyes and the nearby article, or to hold the spectacles in an abnormal position to thereby raise the reading portion of the lenses above the usual level of the reading position.

An object of this invention is to provide an auxiliary bridge that normally is in an inoperative position, but may be adjusted into an operative position when it functions as a support for the spectacles resting on the nose. This has been accomplished by providing a U-shaped member having a bridge portion or a nose engaging portion subtended by vertically disposed leg-like portions, each provided with a horizontally disposed pintle seated in an aperture in a groove member, there being one groove member on either side of the nose and attached to the conventional bridge. The auxiliary bridge member is made from resilient material normally biasing the legs of the bridge member into the grooves when the legs are aligned with the grooves. This auxiliary bridge member and nose engaging member has two positions, an operative position and an inoperative position. When in the inoperative position, the bridge member extends parallel and overlaps the conventional bridge member of the spectacles. By rotating the auxiliary bridge member through an angle of 180° above the pintles, the bridge member is lowered, so as to be located a substantial distance below the horizontal center of the lenses and a considerable distance below the normal bridge to provide a nose engaging support for the spectacles, holding the spectacles at a higher level than when the auxiliary bridge is in the inoperative position, as will appear more fully from the description that follows.

Other objects and advantages reside in the construction of parts, the combination thereof and the mode of operation, as will become more apparent from the following description.

In the drawings,

Figure 1 is a front elevational view of the spectacles showing the auxiliary bridge member in the inoperative position.

Figure 2 is a view similar to Figure 1 showing the auxiliary bridge member in the operative position.

Figure 3 is a top plan view.

Figure 4 is an enlarged view of the auxiliary bridge member removed from the spectacles.

Figure 5 is an enlarged, fragmentary, cross sectional view taken substantially on line 5—5 of Figure 2.

Figure 6 is a fragmentary, cross sectional view of the bridge, taken on the line 6—6 of Figure 2, without the auxiliary bridge and without the lenses.

Figure 7 is a fragmentary illustration of a modification.

Referring to the drawings, the reference character 10 designates a conventional bridge provided with two pairs of lens supporting lugs 12, one pair on either side for supporting the lenses 14, each provided with a long focal area 16 and a short focal area or reading area 18. These lenses are supported in position by the temples 20 secured to the lenses by suitable retaining members 22. A pair of brackets 24, as best shown in Figure 3, supports nose pads 26 normally engaging the side of the nose when the spectacles are worn in a conventional manner.

The structure described thus far is merely illustrative of conventional spectacles. The shape of the lenses, the shape of the bridge member, and the shape and mounting of the temples vary in various makes and styles of spectacles.

An auxiliary bridge assembly has been provided for these spectacles for supporting the short focal length area, or generally referred to as the reading area of the spectacles, on a higher level with respect to the pupils of the eyes, so that nearby objects directly ahead or above the pupils of the eyes may be scrutinized. This assembly includes a pair of vertically grooved members 30 attached to the downwardly depending portions 32 of the conventional bridge 10. Each of these members 30 is provided with a horizontally disposed aperture 34 adapted to receive pintles 36 of an auxiliary bridge member 38 substantially U-shaped and provided with vertically disposed leg portions 40, one on either side of the bight of the U.

The pintles 36 are located in the apertures 34. The auxiliary bridge member 38 is made from resilient material biasing the leg portions 40 into contact with the vertically disposed grooves in members 30. The auxiliary bridge member 38 is seated in the grooves in either one of two positions, an operative position as shown in Figure 2 or an inoperative position as shown in Figure 1 when the auxiliary bridge member 38 overlies the conventional bridge 10 and is substantially coextensive therewith so as to be very inconspicuous. When in the inoperative position, the auxiliary bridge member 38 appears to be the conventional bridge.

By rotating the auxiliary bridge member 38 through an angle of 180°, the auxiliary bridge member 38 is then adjusted into the full line position shown in Figure 2 when the transverse portion of the bridge member 38 is seated on the nose and holds the reading area of the lenses in an elevated position, so as to permit inspection of objects at close range, that is, on the level with the pupils of the eyes or higher. This is very convenient for craftsmen, such as mechanics, toolmakers, et cetera, in that it permits them to work at close range where the work is on the level of the pupils of the eyes or higher.

The resiliency of the bridge member 38 holds the bridge member in the grooves in members 30 when in the up position or inoperative position, as shown in Figure 1, or in the down or operative position, as shown in Figure 2. Furthermore, the resiliency of the auxiliary bridge member 38 is such that the auxiliary bridge member may be adjusted and maintained in some other position than the two full line positions shown in Figures 1 and 2, namely in the dotted position like that shown in Figure 2. This permits adjustments of the short focal or the reading areas into various relative positions with respect to the pupils of the eyes to accommodate various demands. When the auxiliary bridge member is in one of the adjusted positions, the friction of the legs against the sides of the grooved members 30 frictionally holds the bridge member in such an adjusted position.

In the modification disclosed in Figure 7, vertically grooved members 50 are attached to the downwardly projecting portion of the bridge member 10 in a manner identical to that disclosed in the preferred embodiment. Each of the members 50 is provided with a vertical groove similar to the vertical groove in the preferred embodiment. In addition thereto, each member 50 is provided with a plurality of diagonally disposed grooves 52 and 54. Although only two diagonal grooves have been shown, more may be used. By this arrangement the U-shaped member 40 holds the spectacles in one relative position when in the full line downward position shown in Figure 7.

When the U-shaped member 40 is moved into the position 40a, so as to be located in the groove 52, the lenses of the spectacles are raised into a higher position as shown in dotted lines in Figure 7. By adjusting the U-shaped member into the groove 54 illustrated by the dotted line 40b, the position of the lenses is lowered, so as to be in a lower position than when the U-shaped member 40 is in the full line position shown in Figure 7. For temporary use, the U-shaped member may be adjusted into a position outside the grooves to hold the lenses in the desired position. When in such a position, the resiliency of the U-shaped member 40 is used to hold the lenses at the selected position.

When the U-shaped member is positioned in the groove, whether it be the vertical groove or the diagonally disposed grooves 52 or 54, the U-shaped member is positively held in position until forcibly removed to another position. As in the preferred embodiment, the U-shaped member 40 shown in Figure 7 may be raised into an up position where the spectacles will rest upon the conventional nose pads.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. An auxiliary bridge assembly for holding spectacles in the raised position from the normal position, said spectacles being provided with a conventional bridge having depending portions supporting the lenses, said auxiliary bridge assembly including a pair of supporting members fixedly attached to the bridge of the spectacles, said supporting members being provided with a plurality of grooves, each groove of one member being parallel to a groove in the other member, each of the supporting members having a horizontally disposed aperture substantially in the center of the grooves, and a U-shaped auxiliary bridge member, the legs of which are provided with horizontally disposed pintles, there being one pintle for each leg, said pintles being aligned with each other and seated in the apertures of the supporting members, the legs being resiliently biased into the grooves, the auxiliary bridge member being adjustable into the various grooves so as to cause the U-shaped member to engage the nose in various positions to hold the lenses at various heights with respect to the pupils of the eyes.

2. An auxiliary bridge assembly for holding spectacles in the raised position from the normal position, said spectacles being provided with a conventional bridge supporting the lenses, said auxiliary bridge assembly including a pair of supporting members fixedly attached to the bridge of the spectacles, said bridge supporting members being provided with a pair of parallel surfaces extending normal to the general plane of the lenses, each of said surfaces being provided with a plurality of grooves intersecting in a common point, the grooves in one surface being parallel to corresponding grooves in the other surface, one groove in each surface being vertically disposed, each of said surfaces being provided with an aperture in the center of said common point of intersection, and a U-shaped auxiliary bridge member, the legs of which are provided with horizontally disposed pintles, there being one pintle for each leg, said pintles being aligned with each other and seated in the apertures in the supporting members, the legs being resiliently biased into the grooves, the auxiliary bridge member being adjustable from an inoperative position, in which inoperative position the auxiliary bridge member overlies the conventional bridge, into an operative position when the auxiliary bridge member rests on the nose to elevate the lenses of the spectacles above the position of the spectacles when the auxiliary bridge member is in the inoperative position.

References Cited in the file of this patent

UNITED STATES PATENTS

| 461,364 | McBride et al. | Oct. 13, 1891 |
| 1,512,661 | Arntz | Oct. 21, 1924 |
| 1,892,671 | Jahn et al. | Jan. 3, 1933 |
| 1,978,276 | Nelson | Oct. 23, 1934 |

FOREIGN PATENTS

| 2,064 | Great Britain | of 1861 |
| 72,234 | Germany | Dec. 1, 1893 |